United States Patent [19]

Kinney

[11] 4,195,494
[45] Apr. 1, 1980

[54] DYNAMOMETER AND COUPLING FOR A TEST STAND

[75] Inventor: Lionel L. Kinney, Peoria, Ill.

[73] Assignee: Caterpillar Tractor Co., Peoria, Ill.

[21] Appl. No.: 807,030

[22] Filed: Jun. 16, 1977

Related U.S. Application Data

[62] Division of Ser. No. 763,316, Jan. 28, 1977, Pat. No. 4,092,855.

[51] Int. Cl.$^2$ ............................................. F16D 3/18
[52] U.S. Cl. ................................................. 64/9 R
[58] Field of Search ........................ 73/133, 134, 117; 64/9 R

[56] References Cited

U.S. PATENT DOCUMENTS

| | | | |
|---|---|---|---|
| 1,961,426 | 6/1934 | Morgan | 64/9 |
| 2,871,682 | 2/1959 | Tacke | 64/9 |
| 2,924,954 | 2/1960 | Panard | 64/9 |
| 3,070,979 | 1/1963 | Shipley | 64/9 |
| 3,775,997 | 12/1964 | Carman | 64/9 |

FOREIGN PATENT DOCUMENTS 1177423  9/1964  Fed. Rep. of Germany ................ 64/9

*Primary Examiner*—Samuel Scott
*Attorney, Agent, or Firm*—Wegner, Stellman, McCord, Wiles & Wood

[57] ABSTRACT

A dynamometer including a housing comprised of first and second parts relatively rotatable about an axis and defining a chamber, at least one brake element within the chamber carried by each part, the brake elements being in adjacency and relatively movable within the chamber, a motor and spring for moving the elements to frictionally engage and disengage the same, coolant inlet and outlet ports to the chamber, and a base mounting the housing for rotation about the axis, a transducer connected to one of the housing parts and the base, and a coupling device connected to the other of the parts and including a chuck for driven engagement with a mechanical power source, the coupling being axially extendable and allowing limited play in the radial direction.

2 Claims, 2 Drawing Figures

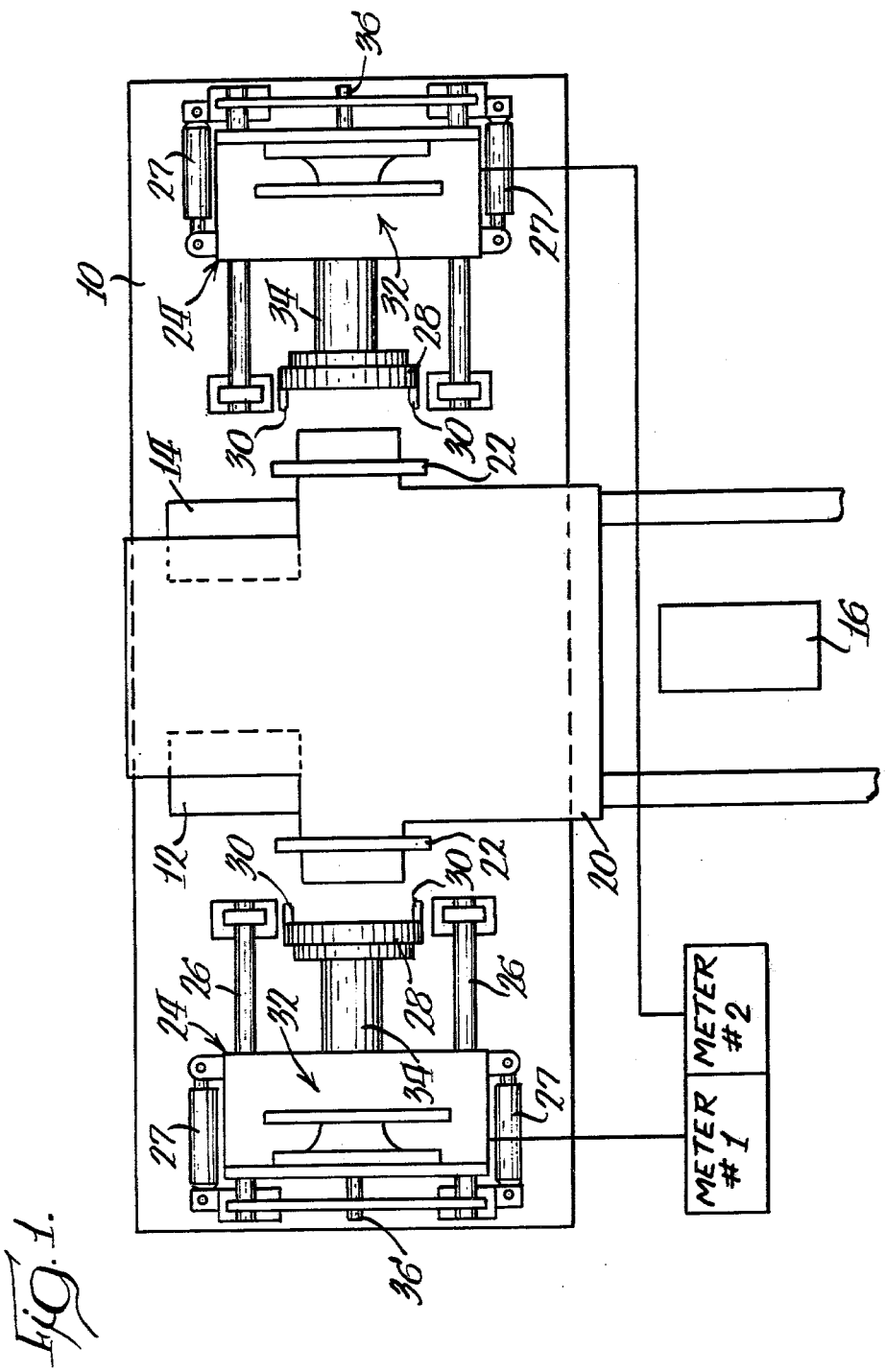

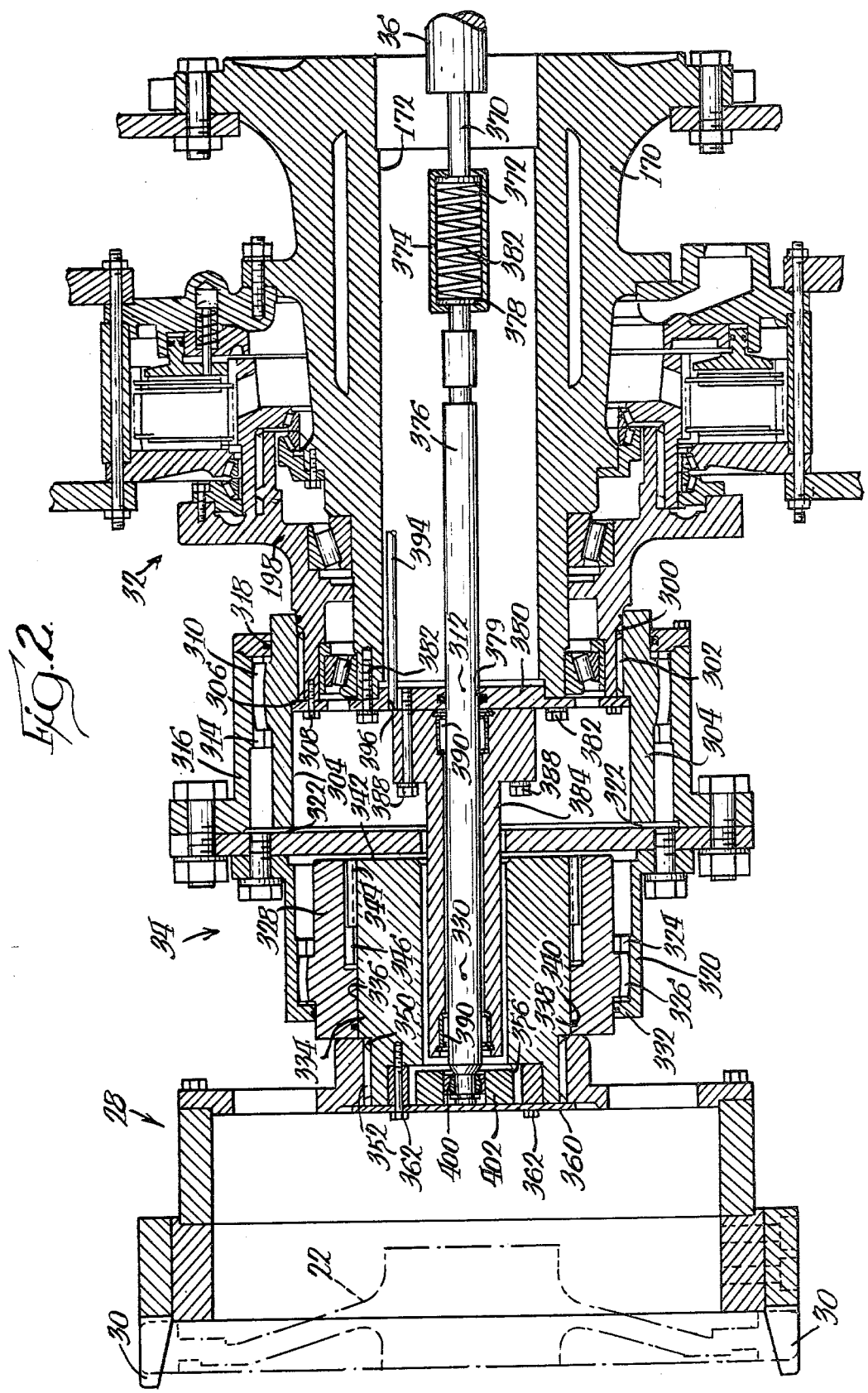

4,195,494

DYNAMOMETER AND COUPLING FOR A TEST STAND

This is a division, of application Ser. No. 763,316 filed Jan. 28, 1977, now U.S. Pat. No. 4,092,855.

BACKGROUND OF THE INVENTION

This invention relates to testing apparatus for mechanical power sources as, for example, vehicles, and to various facets of such testing apparatus.

Manufacturers of quality mechanical power sources almost invariably test the source prior to releasing the same for sale to ensure that the source is performing properly and up to its rated capability. In some cases, the testing has been performed with dynamometers, while in others, the testing has been performed by other means.

Dynamometer testing is generally preferred over other forms of testing by reason of an increased reliability of test results due to the elimination of subjective judgment on the part of operators and/or observers through the use of measuring apparatus. However, dynamometer testing is not altogether satisfactory, particularly where the mechanical power source being tested is operated at a relatively low speed and/or has a high torque output. For example, in crawler-type vehicles, where the testing is to be performed at the final drive, rotational speeds of 100 rpm or less and high torque outputs are invariably present. Conventional dynamometers cannot adequately measure desired operational parameters in such cases, or, if capable, are extremely costly thereby discouraging their use.

As a result, testing of power sources such as crawler-type vehicles has generally been performed on a test track under the control of an operator. The test results therefore can be unreliable due to the subjectivity involved, i.e., the opinion of the operator during the testing procedure, and the results will frequently vary from one operator to the next.

These difficulties are considerably compounded where the power source is a vehicle of the type having power outputs, each of which is independently driven through a hydrostatic transmission or the like. Even though the components for each output may be nominally matched, small differences in the hydraulic system for each output will exist unless a time consuming matching of components is made prior to their assembly into a given vehicle. Because of the expense involved, such a matching is not commercially feasible with the consequence that the operator of the vehicle during the test must observe any tendency of one system to perform more efficiently than the other when commanded to perform identically. If the mismatching is not perceived, when the vehicle is operated by a purchaser, continuous corrective action may be required during vehicle operation to cause the same to move in a straight line, for example, as well as during other operational procedures.

Moreover, many testing systems designed to eliminate the subjectivity involved with purely human testing on a test track or the like require time-consuming setup procedures in affixing the testing equipment to the power source or the vehicle to be tested and/or utilize space consuming, relatively mechanically complex, coupling devices, as treadmill type structures. Such structures are not only expensive, but by reason of their mechanical construction, are subject to periodic breakdown. In some cases, such structures may themselves absorb a sufficient amount of power from the source being tested as to render the test results unreliable.

SUMMARY OF THE INVENTION

The present invention is directed to overcoming one or more of the above problems.

According to the invention, there is provided a coupling that is axially extendable and radially self-aligning and which includes a shaft having radially outwardly directed splines. A first tube slidably receives the shaft and has radially inwardly directed splines on the interior thereof and in engagement with the splines on the shaft and a convex, splined surface on the exterior thereof and remote from one end thereof. The center of the convex splined surface lies on the longitudinal axis of the shaft. One set of the radially directed splines has a relatively short axial length and the other has a relatively long axial length. A second tube receives the first tube and has interior splines in engagement with the convex splined surface and the remainder of its interior surface spaced from the exterior of the first tube. Means, including a second convex splined surface having its center on the longitudinal axis of the shaft and longitudinally spaced from the first tube convex splined surface are provided. Means are provided and are carried by the second tube including a splined interior surface in engagement with the second convex splined surface. The splines on the shaft in the first tube allow axial extension of the coupling, while the convex splined surfaces provide limited play to allow for self-alignment of components in the radial direction.

Other objects and advantages will become apparent from the following specification taken in connection with the accompanying drawings.

DESCRIPTION OF THE DRAWINGS

FIG. 1 is a somewhat schematic, plan view of a test stand made according to the invention; and FIG. 2 is a sectional view of a dynamometer, coupling and chuck made according to a preferred form of the invention with parts omitted for clarity.

DESCRIPTION OF THE PREFERRED EMBODIMENT

An exemplary embodiment of a testing apparatus made according to the invention is shown in the drawings and described herein in connection with the testing of crawler-type vehicles, particularly hydrostatic crawler-type vehicles. However, it is to be understood that the invention is not so limited and can be employed with efficacy in the testing of nonhydrostatic crawler-type vehicles, noncrawler-type vehicles, nonvehicular power sources, power takeoffs on vehicles, and, in the case of the axially extendable, self-aligning coupling shown and described herein, may be utilized in environments totally apart from testing apparatus. The scope of the present invention, and the various facets thereof, therefore, is not to be determined by the drawings or description herein, but by the claims appended hereto.

GENERAL DESCRIPTION

The general organization of a testing apparatus made according to the invention is best illustrated in FIG. 1 which is a somewhat schematic view looking down on a test area. The floor surface 10 of the test area mounts three upwardly extending pedestals 12, 14 and 16, the pedestals 12 and 14 being adapted to support the rear end of a vehicle, shown in outline form at 20, and the pedestal 16 adapted to support the front end of the vehicle. The vehicle 20 is a hydrostatic, crawler-type loader and includes opposed motive power outputs 22 which are in the form of drive sprockets for driving respective endless track chain assemblies (not shown).

In the typical case, the vehicle 20 will be supported on the pedestals 12, 14 and 16 prior to the assembly of the track chains thereto so that the sprockets 22 are free from contact therewith. The use of the pedestals 12, 14 and 16 serves to elevate the vehicle 20 above the floor 10 such that the sprockets 22 are not in engagement therewith. While not of great relevance to the present invention, it is contemplated that the pedestals 12 and 14 will support the vehicle through the usual ripper bar lugs at the rear of the vehicle, while the pedestal 16 will support the vehicle at the usual point of connection for the typical equalizer bar assembly.

Preferably, some sort of adjustable means are provided in connection with the supporting surface of each of the pedestals 12, 14 and 16 so that a variety of differing models of vehicles can be supported on the stand with their sprockets 22 in the same position with respect to the floor 10 and other test stand components, irrespective of differing vehicle dimensions.

On opposite sides of the pedestals 12, 14 and 16, there are disposed dynamometer assemblies, each generally designated 24. Since the dynamometer assemblies 24 are identical, only one will be described in greater detail hereinafter.

The dynamometer assemblies 24 are mounted on longitudinally extending rails 26 for movement towards and away from each other and the pedestals 12, 14 and 16, and thus a vehicle 20 supported thereby. Reciprocal motors 27, typically double-acting hydraulic cylinders, are employed for the purpose. Preferably, the rails 26 are parallel to, but spaced from, the axis of rotation of the sprockets 22.

Each dynamometer assembly 24 includes a releasable coupling 28 shown in the form of a chuck having axially extending teeth 30 which are sized to be releasably received between the teeth on the associated ones of the sprockets 22 to positively couple the associated dynamometer assembly 24 to the associated sprocket 22.

Each dynamometer assembly 24 further includes a dynamometer, generally designated 32, which, as will be seen, is in the form of an oil cooled, hydraulically engaged, spring disengaged, disc brake having a rotary input. The rotary input of each dynamometer 32 is coupled to the associated chuck 28 by an axially extendable, radially self-aligning coupling 34. Each coupling 34 may be selectively extended or retracted by a reciprocal motor such as an associated hydraulic cylinder 36.

The arrangement is such that the rotary input of each dynamometer 32 is coaxial with the axis of rotation of the corresponding sprocket 22 with couplings 34 and the chucks 28 being rotatable about the same axis.

In the usual case, the vehicles to be tested, prior to assembly of the tracks thereto, will be supported on the pedestals 12, 14 and 16 with the dynamometer assemblies 24 positioned by the motors 27 to be at a relatively remote location. Through operation of the motors 27, the dynamometer assemblies 24 will be advanced axially of the sprockets 22 to some predetermined position. At that point in time, the motors 36 will be actuated to extend the respective couplings 34 to cause the chucks 28 to axially positively engage the corresponding one of the sprockets 22. Alternately, the motors 27 may move the assemblies to cause engagement of the chucks, with movement terminated when a predetermined back pressure in the motors 27 is reached. Misalignment between the chucks 28 and the corresponding sprockets 22 in the radial direction is accommodated by the couplings 34, the teeth 30 on the chucks 28 tending to cam themselves into proper engagement with the sprockets 22.

The vehicle engine may then be started and various tests performed. For example, the rotational speed of the sprockets 22 at various engine throttle settings may be measured by suitable takeoffs from the dynamometer assemblies 24 to be described in greater detail hereinafter. Also, the brakes defining the dynamometers 32 may be wholly or partially engaged to obtain torque readings from each of the outputs defined by the sprockets 22 and, where the vehicle is of the type having independent hydrostatic drives for each of the sprockets 22, various adjustments to attain proper balancing may be made.

After the testing procedure has been completed, the dynamometer assemblies 22 and the chucks 28 may be retracted out of engagement with the sprockets 22, the vehicle 20 removed, and the track assemblies assembled to the vehicle after it has been removed from the pedestals 12, 14 and 16.

It is to be particularly observed that the arrangement illustrated in FIG. 1 can be employed advantageously with, for example, vehicles having outputs other than sprockets. For example, chucks could be configured to align with the lugs associated with the rear wheels of a typical passenger car or truck. Alternately, other forms of releasable couplings other than the chucks 28 could be utilized to engage, from an axial direction, track assemblies. As still a further alternative, only one of the dynamometer assemblies 24 could be employed to engage, for example, the power takeoff of a vehicle which typically might open to the rear thereof rather than to the sides as illustrated in FIG. 1.

DETAILED DESCRIPTION

Turning to FIG. 2, the details of the construction of the coupling 34 are illustrated. Details of the construction of the dynamometer 32 and of the chuck 28 may be ascertained by reference to the parent of the present application, Ser. No. 763,316 of which the present application is a division. The details of said parent application are herein incorporated by reference.

The leftmost end of a rotatable housing piece 198 forming part of a dynamometer 32 includes radially outwardly directed splines 300 which are meshed with radially inwardly directed splines 302 on the interior of a tube 304. The tube 304 is sealed against the housing piece by a seal 305. A plate 306 is joined with bolts 308 to the end of the housing piece 198 to capture the splines 302 on the splines 300 and prevent axial movement therebetween while interconnecting the components for mutual rotation.

The exterior of the tube 304 carries a spherical splined surface 310 having its center at the point 312 which is on the axis of rotation of the apparatus. The splines 310 are engaged with radially inwardly directed splines 314 on the interior of a tube 316. The tube 316, at its righthand end, carries a seal 318 which seals against the tube 304 just to the right of the splines 310 and the remainder of the interior of the tube 316 is spaced from the exterior of the tube 304. By reason of the splined connection employing the spherical splines 310, within the tolerances allowed, it will be appreciated that the tube 316 can cant relative to the tube 304. That is, the longitudinal axis of the tube 316 may be skewed with respect to the longitudinal axis of the tube 304 and thus the rotational axis of the assembly.

A further tube 320 is secured to the tube 316 by the various means illustrated in FIG. 2 such that an annular space 322 exists between the lefthand end of the tube 304 and the righthand end of the components rigidly secured to the tube 320. Near its lefthand end, and on the interior surface thereof, the tube 320 carries radially inwardly directed splines 324 which are meshed with a spherical splined surface 326 on the exterior of a tube 328. The spherical splined surface 326 has its center at the point 330 which lies on the rotational axis of the assemblage. The lefthand end of the tube 320 terminates in a radially inwardly directed seal carrying flange 322 which sealingly engages the tube 328 just to the left of the spherical splined surface 326. The remainder of the interior surface of the tube 320 is spaced from the exterior surface of the tube 328, again, to allow the two components to cant relative to each other about the point 330.

A tube-like shaft 334 is slidably received within the tube 328 and for the majority of its length has a smooth cylindrical surface 336 which is sealingly engaged by a seal 338 carried by a radially inwardly directed flange 340 on the lefthand end of the tube 328.

As illustrated in FIG. 2, the coupling 34, which it will be recalled is axially extendable, is shown in its retracted position, and in such a position, the righthand end 342 of the shaft 334 is axially spaced from components to the right thereof. The end 342, on the exterior surface of the shaft 334 carries radially outwardly directed splines 344 of relatively short axial length which are slidably engaged with radially inwardly directed splines 346 on the interior of the tube 328. Thus, it will be appreciated that the shaft 334 may be extended from the coupling to the left until such time as the splines 344 stop against the flange 340. Because of the long axial length of the splines 346, for any position of the shaft 334 within the tube 328 a rotary driving connection will be established.

The lefthand end of the shaft 334, at a reduced diameter section, carries radially outwardly directed splines 350 which are engaged with radially inwardly directed splines 352 carried by the hub 354 of the chuck. In addition, a cylindrical pocket 356 is located in the lefthand of the shaft 334. A plate 360 is secured as by bolts 362 to the shaft 334 and captures the chuck on the end of the shaft 334, closes the pocket 356, and seals the coupling by seals 362 and 364.

Returning to the cylinder 36, which it will be recalled is utilized to extend or retract the coupling 34, the same is partly disposed within the interior bore 172 of a casting 170 forming a non-rotatable part of the dynamometer 32 and includes an extendable rod 370 terminating in a cap 372 within a spring housing 374. A rod 376 extends from the opposite side of the housing 374 and includes a similar cap 378 within the housing 374 and opposite from the cap 372. A coil compression spring 382 is contained within the housing and interposed between the caps 372 and 378.

The rod 376 extends through a seal carrying bore 379 in a plate 380 which closes the lefthand end of the bore 172, preloads the bearings 200 and 202 to a desired degree and is held in place by a plurality of bolts 382. An elongated sleeve 384 extends through the center of the tube-like shaft 334 and includes an enlarged base 386 secured by bolts 388 to the plate 380. The rod 376 extends through the interior of the sleeve 384 into the pocket 356. Bearings 390 at opposite ends of the interior of the sleeve 384 allow relatively free relative rotary movement between the rod 376 and the sleeve 384.

The end of the rod 376 within the pocket 356 mounts a spherical bearing 391 which, in turn, mounts a block 392. The block 402 is sized to be relatively freely movable within the pocket 356 but is also captured therein. The same frictionally engages the righthand side of the plate 360 when the coupling 34 is being extended by the cylinder 36 and will engage the righthand surface of the pocket 356 in the shaft 334 when the cylinder 36 is retracting the coupling 34.

From the foregoing, it will be appreciated that the coupling 34 is totally sealed and, in the usual case, a liquid lubricant will be located in the interior thereof at a level extending at least up to the centerline of the coupling 34. However, because the coupling is extendable, its volume will vary depending on the degree of extension or retraction of the shaft 334 with respect to the tube 328. Accordingly, a vent tube 394 extends through the interior 172 of the bell-shaped casting 170 to the exterior of the dynamometer 32 to a reservoir or the like (not shown) having an opening above the level of the lubricant within the coupling 34 when the same is fully retracted. The tube 394 is in fluid communication with the interior of the coupling via a bore 396 in the plate 380.

With respect to the coupling 34 generally, the purpose of the floating construction including the block 402 is to provide a connection whereby the chuck 28 may be moved axially for engagement or disengagement of the power source to be tested and yet eliminate the imposition of bending stresses on the rod 376 when there is misalignment between the rotational axis of the power source and that of the dynamometer which are accommodated by the coupling 34.

In general, the block 402 is sized so that it will never contact the interior cylindrical wall of the pocket 356 regardless of the amount of skewing of the coupling with respect to the rotational axis of the dynamometer.

It will also be observed that the exterior surface of the sleeve 384 is spaced from the interior surface of the bore in the hollow shaft 334 and yet extends substantially the entire length of the shaft 334. The purpose of the sleeve 384 is to support the chuck 28 when disengaged from a power source to be tested. The connections in the coupling including the spherical splined surfaces 310 and 326 would allow sufficient movement about the points 312 and 320, respectively, such that the chuck would droop under its own weight to the point where it could not align itself with the rotary power source to be tested through the camming action mentioned earlier if it were not supported. The sleeve 384 provides such support through contact with the interior surface of the hollow shaft 334 and thus eliminates any need for an external support and/or guide for the chuck 28.

Preferably, the spacing between the sleeve 384 and the shaft 334 is just slightly greater than the maximum offset that can be permitted by design parameters when the coupling is being driven by a power source engaged by the chuck 28. This prevents rubbing contact of the shaft 334 with the sleeve 384 when the dynamometer is being driven and yet minimizes the amount of drooping of the chuck that is permitted to occur.

It is also to be observed that the components, including the spring housing 374 and the cylinder 36, will generally not be provided in the same unit. Where the cylinder 36 is utilized, it will generally have its rod 370 connected directly to the rod 376 and the degree of constant axial biasing force applied to the chuck can be regulated by controlling the back pressure of hydraulic fluid within the cylinder 36.

Where the spring housing 374 and related components are utilized, the righthand end thereof, as viewed in FIG. 2, will generally be connected to a suitable base (not shown) directly and the components sized so that the spring 382 will fully extend the coupling 34 when there is no resisting force applied to the chuck 28. In such a case, the dynamometer will be advanced to engage the chuck 28 with a sprocket 22 solely by the motors 27 (FIG. 1) and as the chuck 28 engages the sprocket, the spring 382 will begin to compress until movement of the dynamometer is terminated at some time whereat the spring will provide the desired constant axial biasing force to the chuck 28.

The unique coupling employed herein positively couples the chuck to the dynamometer and yet, by reason of its limited play, ensures proper alignment during positive engagement of the chuck with the output of a vehicle to be tested.

The embodiments of the invention in which an exclusive property or privilege is claimed are defined as follows:

1. A coupling comprising:
   a hollow shaft having radially outwardly directed splines;
   a tube slidably receiving said shaft and having radially inwardly directed splines on the interior thereof in engagement with the splines on said shaft;
   one set of said radially directed splines having a relatively short axial length and the other having a relatively long axial length;
   means connected to said tube defining an interior splined surface;
   means including a convex splined surface having its center on the longitudinal axis of said shaft and engaged with said interior splined surface;
   a support sleeve extending at least partially through said hollow shaft and normally spaced therefrom; and
   means mounting said support sleeve and said convex splined surface.

2. A coupling comprising:
   a hollow shaft having radially outwardly directed splines of relative short axial length;
   a first tube slidably receiving said shaft and having radially inwardly directed splines of relatively long axial length on the interior thereof in engagement with the splines on said shaft and a spherical splined surface on the exterior thereof and remote from one end thereof, the center of said spherical splined surface lying on the longitudinal axis of said shaft;
   a second tube receiving said first tube and having interior splines in engagement with the spherical splined surface, the remainder of the interior surface of said second tube being spaced from the exterior of said first tube;
   means including a second spherical splined surface having its center on said longitudinal axis and longitudinally spaced from said first tube spherical splined surface;
   means carried by said second tube including a splined interior surface in engagement with said second spherical spline surface; and
   means including a shaft-like element extending into said hollow shaft but normally spaced therefrom for supporting said hollow shaft when said hollow shaft is not otherwise supported.

* * * * *